United States Patent
Terada et al.

(10) Patent No.: US 10,254,886 B2
(45) Date of Patent: *Apr. 9, 2019

(54) CONTENT DISPLAY APPARATUS, PROGRAM, AND CONTENT PROVIDING SYSTEM

(71) Applicant: SHARP KABUSHIKI KAISHA, Sakai, Osaka (JP)

(72) Inventors: Satoshi Terada, Sakai (JP); Hiroki Munetomo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,688

(22) Filed: Dec. 22, 2017

(65) Prior Publication Data

US 2018/0121017 A1 May 3, 2018

Related U.S. Application Data

(63) Continuation of application No. 15/219,947, filed on Jul. 26, 2016, now Pat. No. 9,886,126.

(30) Foreign Application Priority Data

Jul. 28, 2015 (JP) .................................. 2015-148662

(51) Int. Cl.
*G06F 3/041* (2006.01)
*H04W 4/80* (2018.01)

(52) U.S. Cl.
CPC ............ *G06F 3/0416* (2013.01); *G06F 3/041* (2013.01); *G06F 3/0412* (2013.01); *H04W 4/80* (2018.02)

(58) Field of Classification Search
CPC ..... H04W 4/008; G06F 3/0416; G06F 3/0412
See application file for complete search history.

(56) References Cited

U.S. PATENT DOCUMENTS

| | | | |
|---|---|---|---|
| 2008/0088513 A1* | 4/2008 | Saitou | H01Q 1/22 343/702 |
| 2008/0317479 A1* | 12/2008 | Kadowaki | G03G 15/553 399/12 |
| 2010/0282835 A1* | 11/2010 | Wakamoto | G06K 7/10346 235/375 |

FOREIGN PATENT DOCUMENTS

JP 2000-215278 A 8/2000

* cited by examiner

*Primary Examiner* — Muhammad N Edun
(74) *Attorney, Agent, or Firm* — ScienBiziP, P.C.

(57) ABSTRACT

A content display apparatus includes a plurality of communication antennas arranged on the same side as the display portion, a non-contact communication portion which performs non-contact communication with an information terminal apparatus by using each of the plurality of communication antennas, a content display control portion which displays a content on the display portion; and a communication antenna control portion which performs control to validate one communication antenna of the plurality of communication antennas based on a display position of the content displayed by the content display control portion, in which the information terminal apparatus performs non-contact communication with the validated communication antenna and obtains additional information of the displayed content.

7 Claims, 16 Drawing Sheets

CONTENT DISPLAY APPARATUS, PROGRAM, AND CONTENT PROVIDING SYSTEM

This application is a continuation application of U.S. patent application Ser. No. 15/219,947, filed on Jul. 26, 2016 and entitled "CONTENT DISPLAY APPARATUS, PROGRAM, AND CONTENT PROVIDING SYSTEM." The disclosure of such parent application is incorporated herein by reference.

BACKGROUND OF THE INVENTION

(1) Field of the Invention

The present invention relates to a content display apparatus including a display portion which displays a content and a touch detection portion, and the like.

(2) Description of the Prior Art

In recent years, there has been an increasing number of equipment performing non-contact communication, such as NFC (Near Field Communication), by using a non-contact IC card (non-contact communication apparatus). In order to perform non-contact communication by using the non-contact communication apparatus, not only an antenna for communication (hereinafter, referred to as a "non-contact communication antenna"), but also a reader writer apparatus (hereinafter, referred to as a "RW apparatus") which acquires radio waves from a non-contact communication apparatus of the other party to perform communication control is required.

Usage to transmit and receive data between a content display apparatus and an information terminal apparatus of a user by using these non-contact communication apparatuses has been also proposed. For example, usage such that when touching is performed with an information terminal apparatus to an antenna arranged beside an advertising display, an advertisement displayed on the display is downloaded in the information terminal apparatus which has performed the touching has been implemented (for example, refer to Patent Literature 1).

[Patent Document 1] Japanese Laid-Open Patent Publication No. 2000-215278

However, also when a plurality of non-contact communication antennas are provided in the content display apparatus, positions of the non-contact communication antennas are fixed in terms of hardware, so that there is no correlation between a position at which the content is displayed and a contact position with a communication unit to be touched. That is, wherever the content is displayed on the content display apparatus, a user needs to perform a communication operation (operation for touching) at the position of the content display apparatus, at which the non-contact communication antenna is provided, and the user is difficult to perform the operation intuitively.

In the case of a large-screen content display apparatus disposed in a shopping center or the like these days, a position of an operation for content selected by a user is largely away from a position of a communication operation by the user, so that a problem of causing inconvenience in use for the user arises.

SUMMARY OF THE INVENTION

In view of the aforementioned problems, the invention aims to provide a content display apparatus or the like capable of performing display of content and a communication operation more appropriately by appropriately selecting a communication antenna to be validated according to a display position of the content.

A first aspect of the invention is a content display apparatus, including:
  a display portion which displays a content;
  a plurality of communication antennas arranged on the same side as the display portion;
  a non-contact communication portion which performs non-contact communication by using each of the communication antennas;
  a content display control portion that is configured to display the content on the display portion; and
  a communication antenna control portion that is configured to perform control to validate one communication antenna of the plurality of communication antennas based on a display position of the content displayed by the content display control portion.

A second aspect of the invention is a non-volatile recording medium recorded with a program for causing a computer, mounted in a content display apparatus including a display portion which displays a content; a plurality of communication antennas arranged on the same side as the display portion; and a non-contact communication portion which performs non-contact communication by using each of the communication antennas, to execute:
  a content display step of displaying the content on the display portion; and
  a communication antenna control step of performing control to validate one communication antenna of the plurality of communication antennas based on a display position of the content displayed by the content display step.

A third aspect of the invention is a content providing system, including:
  a content display apparatus having a display portion which displays a content; and
  an information terminal apparatus, in which
  the content display apparatus includes
  a plurality of communication antennas arranged on the same side as the display portion;
  a non-contact communication portion which performs non-contact communication with the information terminal apparatus by using each of the communication antennas;
  a content display control portion that is configured to display the content on the display portion; and
  a communication antenna control portion that is configured to perform control to validate one communication antenna of the plurality of communication antennas based on a display position of the content displayed by the content display control portion, and
  the information terminal apparatus performs non-contact communication with the communication antenna validated by the communication antenna control portion to obtain additional information of the displayed content.

Advantages of Invention

According to the invention, in a content display apparatus having a plurality of communication antennas arranged on the same side as a display portion, content is displayed on the display portion and one communication antenna of the plurality of communication antennas is validated based on a display position of the displayed content. Then, it is possible to perform non-contact communication by using the validated communication antenna. Thereby, the position of the displayed content and a position of the communication antenna are intuitively recognized and the easy-to-use content display apparatus is able to be provided.

DESCRIPTION OF THE PREFERRED EMBODIMENTS

Description will hereinafter be given for embodiments of the invention with reference to the accompanying drawings. Note that, as one example, a content providing system and a content display apparatus in the invention will be described by taking, for example, an information display disposed in a shopping mall or the like as an example, but may be of course applied to other display apparatuses.

1. The First Embodiment 1.1 Overall Configuration

Figure 1:
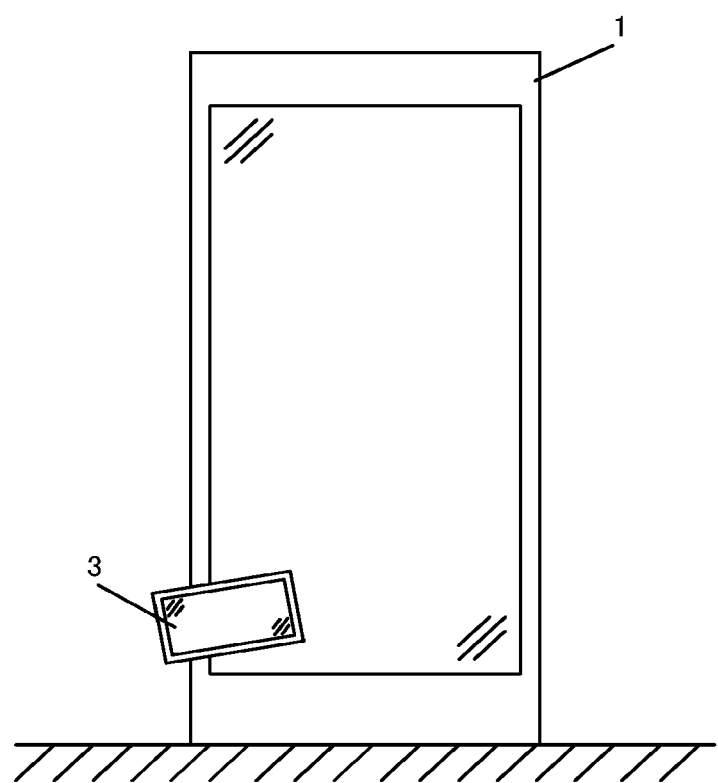
FIG. 1 is a view for explaining an entire apparatus of a first embodiment.

First, an entire configuration in a first embodiment will be described with reference to FIG. 1. FIG. 1 illustrates a content display apparatus 1. In the present embodiment, the content display apparatus 1 is disposed in an upright position (in a state where vertical resolution is higher).

Such a content display apparatus 1 is disposed to display various information, for example, in a shopping mall, a station, an event site, or the like. For example, by displaying content received by communication, various information (contents) is able to be switched and displayed.

Further, contrivance is adopted so that the information is easily accessed by a user. For example, it is considered to display a QR code or use an apparatus for transmitting content information by infrared light.

In the present embodiment, by using non-contact communication (NFC (Near Field Communication)) as one of near field radio communication, content information is transmitted to an information terminal apparatus 3 of the user.

When the user holds (touches) the information terminal apparatus 3 over the content display apparatus 1, communication is started by the NFC. Thereby, specified content information is transmitted to the information terminal apparatus 3.

1.2 Functional Configuration

Figure 2:
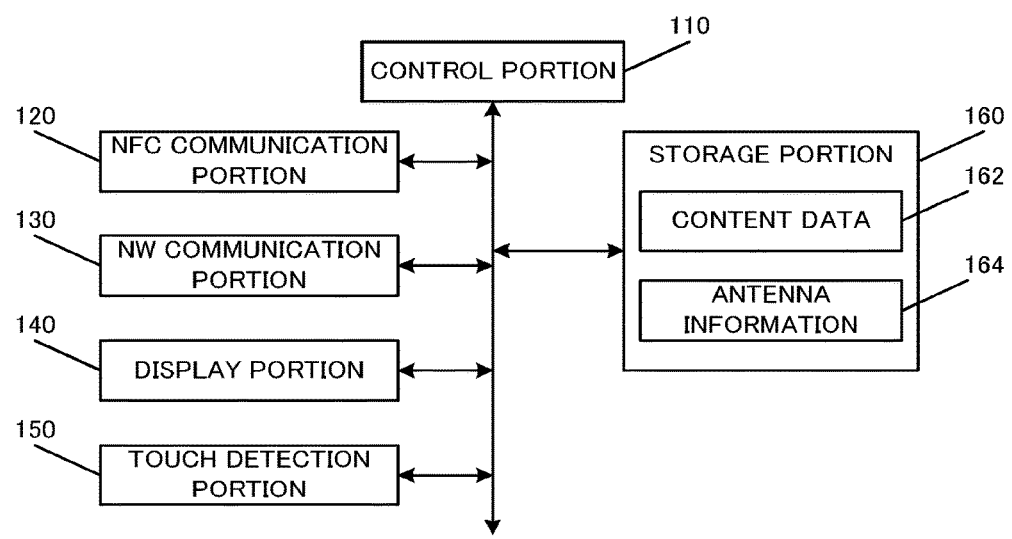
FIG. 2 is a block diagram illustrating a functional configuration of a content display apparatus in the first embodiment.

Next, a functional configuration of the content display apparatus 1 in the present embodiment will be described with reference to FIG. 2. As illustrated in FIG. 2, the content display apparatus 1 includes a control portion 110, a NFC communication portion 120, a NW communication portion 130, a display portion 140, a touch detection portion 150, and a storage portion 160.

The control portion 110 is a functional portion for controlling the whole of the content display apparatus 1. The control portion 110 realizes various functions by reading and executing various programs stored in the storage portion 160, and is configured by, for example, a CPU (Central Processing Unit) or the like.

The NFC communication portion 120 is a functional portion for performing non-contact communication. The communication is performed, for example, with the standard of ISO/IEC 14443, ISO/IEC 18092 (Felica) and the like.

Figure 3:
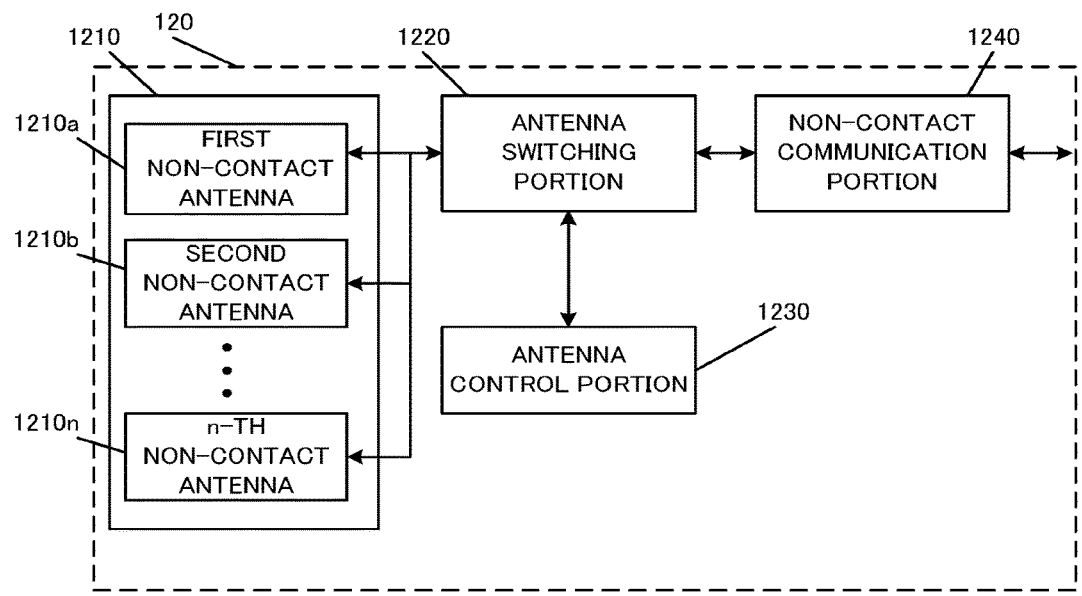
FIG. 3 is a block diagram illustrating a functional configuration of a NFC communication portion in the first embodiment.

Next, the NFC communication portion 120 will be described in detail with reference to FIG. 3. The NFC communication portion 120 includes a non-contact antenna 1210, an antenna switching portion 1220, an antenna control portion 1230, and a non-contact communication portion 1240.

The non-contact antenna 1210 is constituted by a plurality of antennas. For example, the non-contact antenna 1210 has a first non-contact antenna 1210a, a second non-contact antenna 1210b, . . . , and a n-th non-contact antenna 1210n.

The plurality of non-contact antennas are connected to the antenna switching portion 1220. An available antenna is switched by this antenna switching portion 1220. Moreover, control for the switching is performed by the antenna control portion 1230. Note that, since the NFC communication portion 120 is described as a module in the present embodiment, the antenna control portion 1230 is provided, but the control may be performed by the control portion 110.

The non-contact communication portion 1240 is a communication portion for the content display apparatus 1 to perform non-contact communication (for example, NFC communication) with the information terminal apparatus 3. The communication is performed with a NFC communication portion of the information terminal apparatus 3 through a non-contact antenna. In the present embodiment, it is configured so that the non-contact antenna 1210 is switched successively in each predetermined time (for example, 10 ms). Note that, a time to switch the non-contact antenna 1210 may be determined in advance or the non-contact antenna 1210 may be switched by setting. Moreover, setting may be performed such that the non-contact antenna 1210 is switched according to types of content or a time (for example, setting to increase an interval immediately after opening a store or just before closing the store or to decrease the interval on the holiday).

Note that, as one example of the communication, a case where the NFC communication portion of the information terminal apparatus 3 is detected, for example, by the second non-contact antenna 1210b will be described. In this case, the antenna switching portion 1220 validates the second non-contact antenna 1210b as the antenna to be used. The non-contact communication portion 1240 then performs communication with the information terminal apparatus 3 through the second non-contact antenna 1210b.

The NW (Network) communication portion 130 is a functional portion for performing communication with another apparatus, a server, and the like by connecting to a network (for example, wireless LAN, 3G-mobile communication network, or LTE communication network). For example, the content is received through the NW communication portion 130.

The display portion 140 is a display device for displaying various information. For example, it is constituted by a liquid crystal display (LCD), an organic EL panel, or the like.

The touch detection portion 150 is a functional portion for detecting a touch operation of the user. As a method for detecting a touch, any of a resistive-film method, an infrared ray method, an electromagnetic induction method, a capacity method, and the like may be used. Typically, the display portion 140 and the touch detection portion 150 are integrally formed and used as a touch panel.

Figure 4:
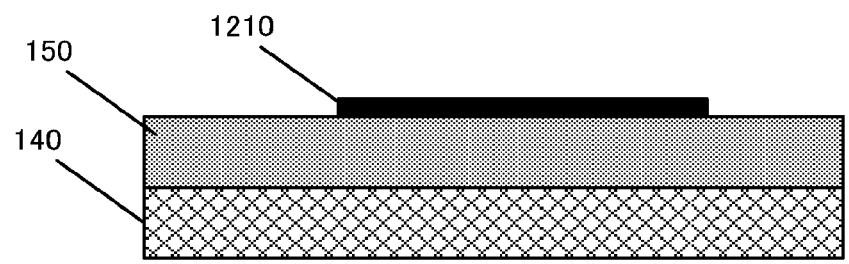
FIG. 4 is a view for explaining a positional relation of a display portion, a touch detection portion, and a non-contact antenna in the first embodiment.
Figure 5:
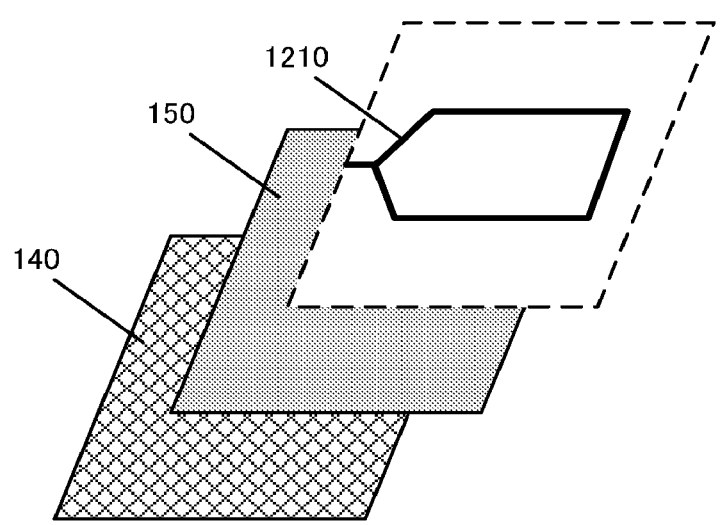
FIG. 5 is a view for explaining a positional relation of the display portion, the touch detection portion, and the non-contact antenna in the first embodiment.

Here, a configuration of each apparatus will be described with reference to FIG. 4 and FIG. 5. That is, the touch detection portion 150 is provided on a display panel of the display portion 140. This makes it possible to detect a touch input from the user.

The non-contact antenna 1210 is arranged on the touch detection portion 150. Thereby, the communication with use of the NFC is able to be performed when the user touches a part of the display portion 140, on which content is displayed, with the information terminal apparatus 3.

Note that, a similar effect is achieved also when the non-contact antenna 1210 is arranged between the display portion 140 and the touch detection portion 150. That is, the non-contact antenna 1210 is arranged on the same side as the display portion 140 of the content display apparatus 1.

A plurality of non-contact antennas 1210 are arranged on the display portion 140. Thereby, the non-contact antenna 1210 to be used is determined according to the content.

The storage portion 160 is a functional portion in which various programs and various data needed for operations of the content display apparatus 1 are stored. The storage portion 160 is constituted by, for example, a semiconductor memory, a HDD (Hard Disc Drive), and the like.

The storage portion 160 stores therein content data 162 and antenna information 164.

As the content data, information about content to be displayed on the display portion 140 is stored. For example, a still image and a moving image to be displayed are stored. Further, additional information corresponding to the content is stored.

The additional information is information transmitted to the information terminal apparatus 3 through the NFC communication portion 120. Example thereof include URL information indicating information related to the content, discount information, or information of an image or the like. The user is able to obtain the additional information by touching the NFC communication portion 120 (the n-th non-contact antenna 1210n) of the content display apparatus 1 with the information terminal apparatus 3.

Figure 6:
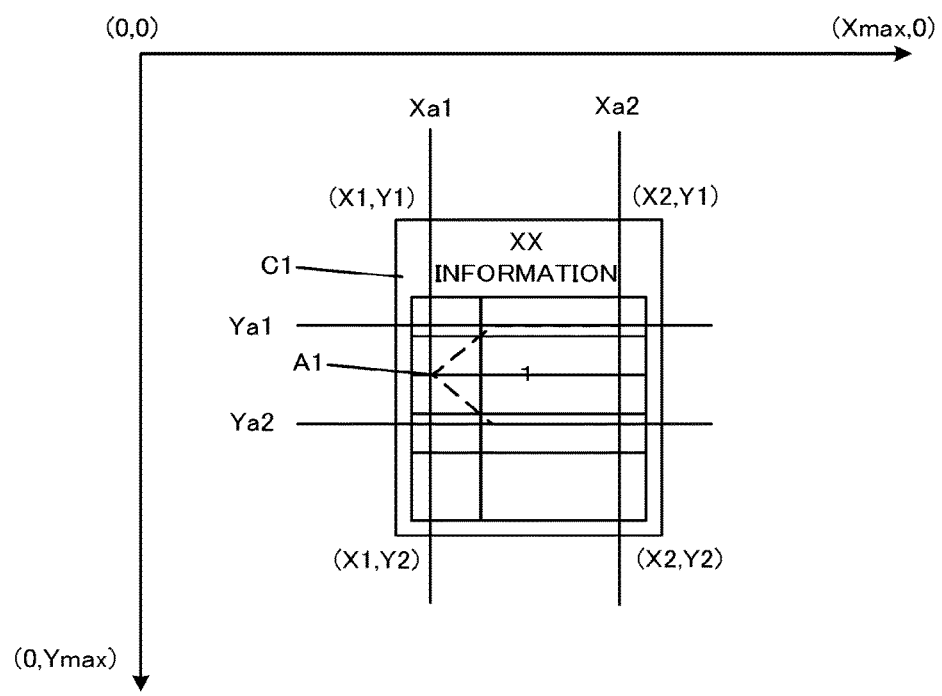
FIG. 6 is a view for explaining antenna information in the first embodiment.

As the antenna information 164, information about a non-contact antenna is stored. For example, a position of a coordinate of the non-contact antenna on a display screen displayed on the display portion 140 is stored. For example, a relation between a display coordinate and a coordinate at which the non-contact antenna is positioned will be described with reference to FIG. 6.

For example, in a coordinate system of $(0, 0)$-$(Xmax, Ymax)$, a non-contact antenna A1 is positioned at $(Xa1, Ya1)$-$(Xa2, Ya2)$. For example, it is assumed that content C1 is displayed at $(X1, Y1)$-$(X2, Y2)$ at this time. In this case, it is able to be judged that the content C1 is displayed on the non-contact antenna A1. It is also able to be judged that the content C1 is displayed correspondingly on the non-contact antenna A1. In this manner, with a certain coordinate of the non-contact antenna and the coordinate at which the content is displayed, correspondence between the non-contact antenna and the content is judged.

1.3 Processing Flow

Next, a processing flow in the first embodiment will be described.

First, main processing of the present embodiment will be described with reference to FIG. 7. First, content having additional information is displayed on the display portion 140 (step S102).

Here, the information terminal apparatus 3 is detected by any non-contact antenna (step S104; Yes). At this time, a coordinate at which the content (content having additional information) is currently displayed is obtained (step S106).

A communication antenna is specified based on the obtained coordinate (step S108). Specifically, the non-contact antenna included in the coordinate of the displayed content is read from the antenna information 164 and specified as the communication antenna.

Subsequently, the specified communication antenna (non-contact antenna) is validated (step S110), and when communication by the NFC is detected, NFC communication processing is executed (step S112; Yes to step S114). That is, by executing the NFC communication, the additional information of the displayed content is transmitted to the information terminal apparatus 3.

1.4 Example

Figure 8:
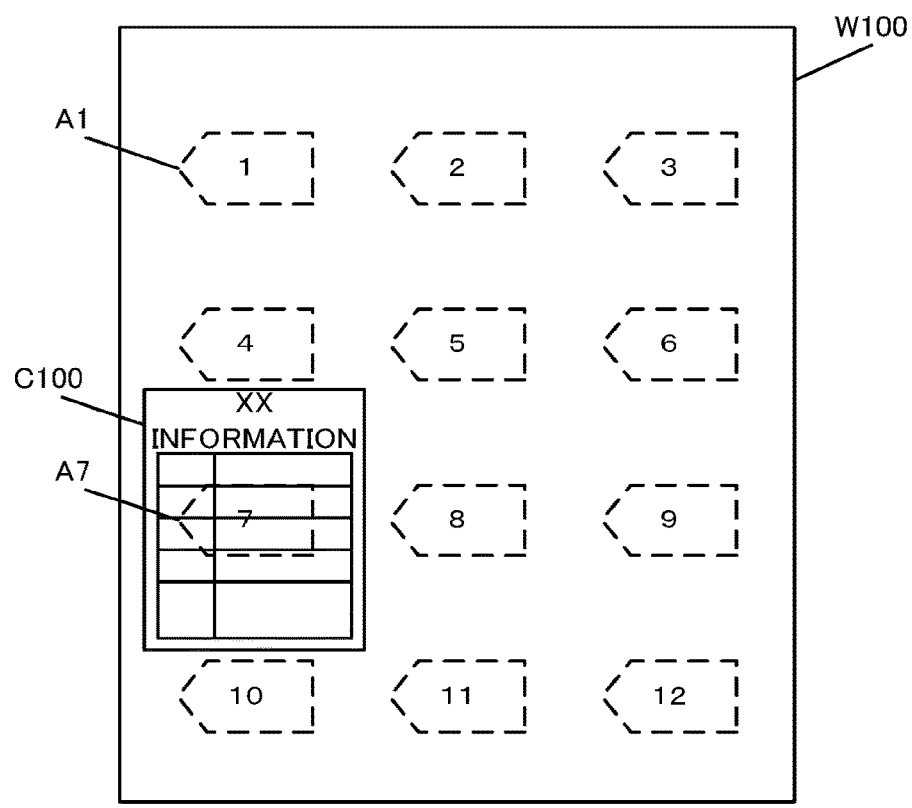
FIG. 8 is a view for explaining an example in the first embodiment.

An example of the present embodiment will be described with reference to a drawing. FIG. 8 schematically illustrates arrangement of the non-contact antennas 1210 (FIG. 3) in the display portion 140 (FIG. 2) and illustrates a display screen W100 displayed on the display portion 140. For example, the first non-contact antenna 1210a is arranged as the non-contact antenna A1.

In addition, content C100 is displayed on the display screen W100 of FIG. 8. This content C100 is displayed on a non-contact antenna A7. In this case, the non-contact antenna A7 is included in a display range of the content C100 on the display portion 140. Thus, only the non-contact antenna A7 of the plurality of non-contact antennas is made "ON" (only the non-contact antenna A7 is specified/validated as the communication antenna (step S108 of FIG. 7)). That is, all the non-contact antennas are not required to be made ON and nothing is executed even when the information terminal apparatus 3 touches a part other than the non-contact antenna A7.

In this manner, according to the present embodiment, it is possible to realize the content display apparatus 1 capable of varying a touching position according to the position of the displayed content.

According to the present embodiment, by selecting the valid non-contact antenna of the plurality of non-contact antennas, the non-contact communication is able to be performed with only one non-contact communication portion. Thereby, for example, as one example of a non-contact communication portion, the number of IC cards mounted in a transceiver is reduced and an effect of cost reduction is expected.

The number and positions of antennas to be switched according to the content which is currently selected are able to be changed and the position of the non-contact antenna which is currently able to be selected is indicated to the user by displaying the content. Accordingly, the user is able to perform a natural operation.

2. The Second Embodiment

Next, a second embodiment will be described. The second embodiment is an embodiment for explaining a relation between content and a non-contact antenna.

That is, though description has been given in the first embodiment for a case where the non-contact antenna at the position included in the displayed content is valid, for example, when the non-contact antenna is not included completely, the closest non-contact antenna in contact with a display area of the content or a non-contact antenna having the largest overlapping area is specified as the communication antenna.

Figure 9:
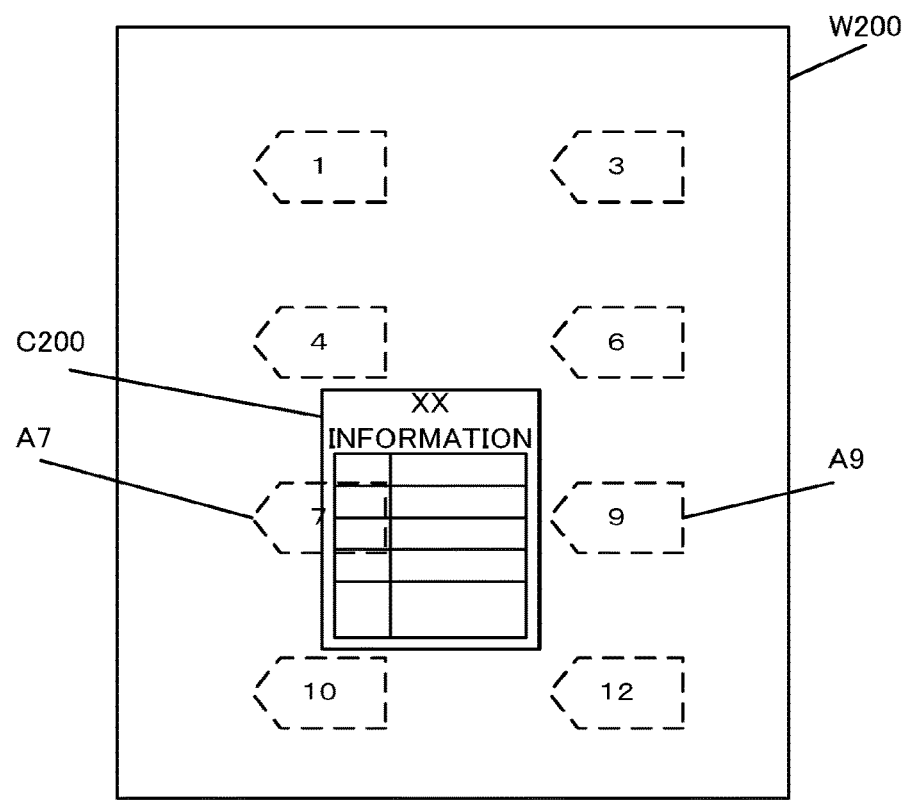
FIG. 9 is a view for explaining an example in a second embodiment.

FIG. 9 illustrates a display screen W200 displayed on the display portion 140 (FIG. 2) in the present embodiment. Content C200 is displayed on the display screen W200. In this case, there is no non-contact antenna which is completely included in a display area of the content C200. Here, a non-contact antenna A7 is the most largely included in the display range of the content C200 on the display portion 140.

Figure 7:
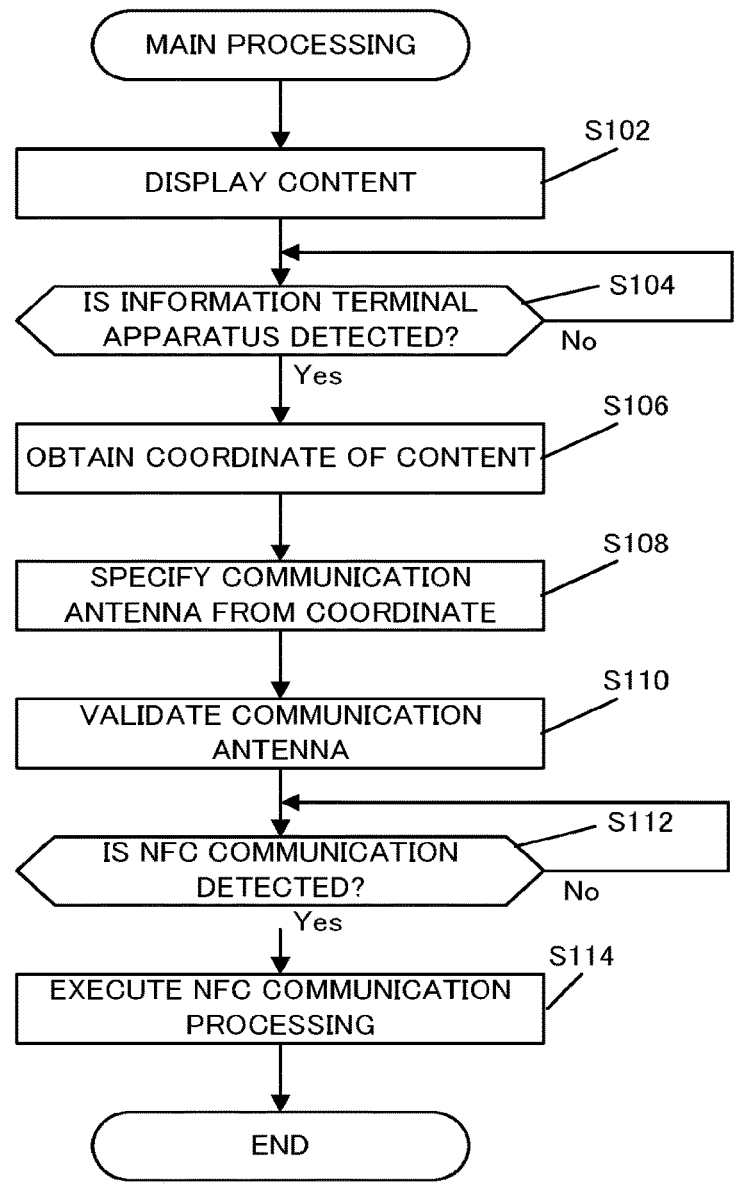
FIG. 7 is an operation flow for explaining processing in the first embodiment.

Thus, the non-contact antenna A7 which is a non-contact antenna in contact with the content or a non-contact antenna having the largest overlapping area is specified as the communication antenna for communication (step S108 of FIG. 7).

In this manner, according to the present embodiment, even when there is no non-contact antenna completely included in the content, a non-contact antenna in a vicinity of the content is able to be specified and used as the communication antenna.

Such an embodiment is an embodiment effective, in particular, for a case where the non-contact antenna is shifted from the position at which the content is arranged when the user optionally moves the content C200.

3. The Third Embodiment

Next, a third embodiment will be described. The third embodiment is an embodiment in which when there a plurality of non-contact antennas which are able to be specified, a non-contact antenna is selected according to a predetermined rule.

For example, description will be given for an embodiment in which when there a plurality of non-contact antennas near the displayed content, a non-contact antenna on the right side of the displayed content is selected.

Figure 10:
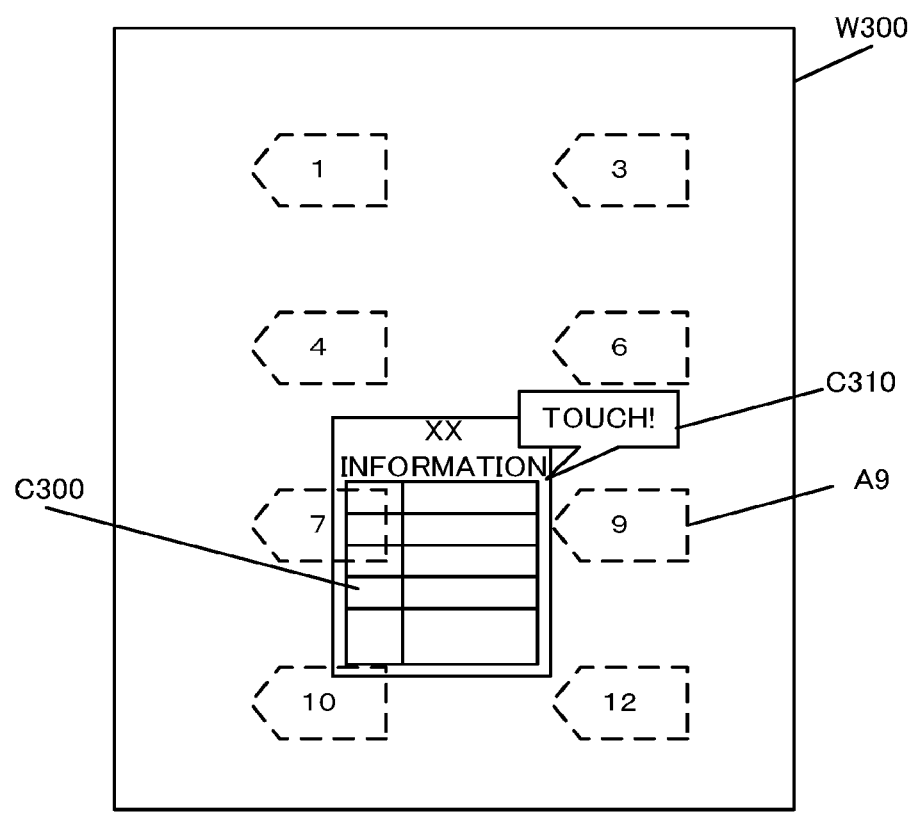
FIG. 10 is a view for explaining an example in a third embodiment.

FIG. 10 illustrates a display screen W300 displayed on the display portion 140 (FIG. 2) in the present embodiment. Content C300 is displayed on the display screen W300. In this case, though there are a plurality of non-contact antennas on the display portion 140, a non-contact antenna A9 positioned on the right side of the content C300 is specified and used as the communication antenna (step S108 of FIG. 7).

In this manner, when content is displayed, a non-contact antenna in a predetermined direction of the content may be selected and used. This is because when an identifiable display C310 of "touch" is provided, for example, as in FIG. 10, the user is likely to touch the right side. Accordingly, processing of preferentially selecting a non-contact antenna on the right side is effective.

4. The Fourth Embodiment

Next, a fourth embodiment will be described. The fourth embodiment is an embodiment in which an identifiable display based on additional information is performed (content identifiable information is displayed) for content on the display portion (FIG. 2).

Figure 11:
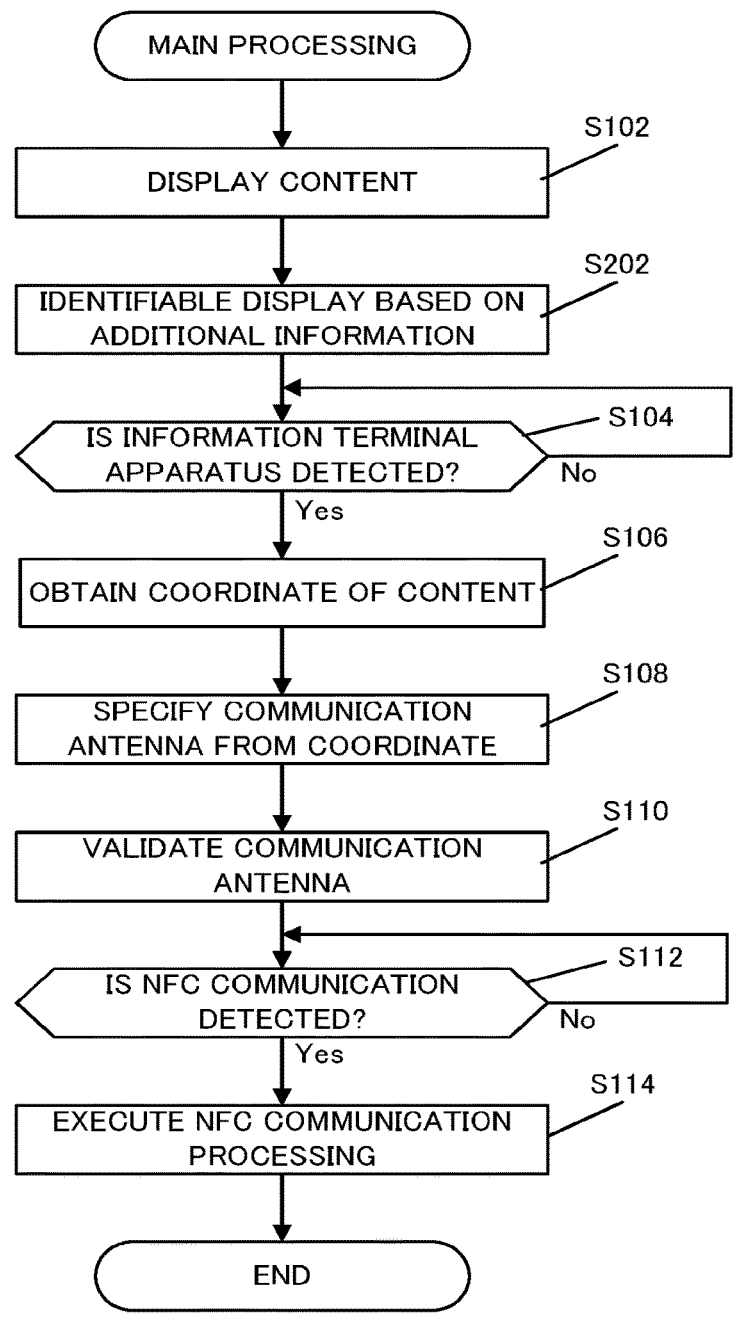
FIG. 11 is an operation flow for explaining processing in a fourth embodiment.

FIG. 11 illustrates a processing flow in the present embodiment. Note that, the processing flow of FIG. 11 is obtained by changing the processing flow of FIG. 7 described in the first embodiment, in which the same reference signs will be assigned to the same processing and description thereof will be omitted.

That is, in FIG. 11, after content is displayed (step S102), an identifiable display based on additional information is performed for the display of the content (step S202). For example, this identifiable display allows the user to recognize that additional information of URL (Uniform Resource Locator) is transmitted, coupon information is transmitted, or image/music data is transmitted.

5. The Fifth Embodiment

Next, a fifth embodiment will be described. The fifth embodiment is an embodiment in which a communication antenna (non-contact antenna) is displayed in an identifiable manner (communication antenna identifiable information is displayed) to guide the user which position is to be touched.

Figure 12:
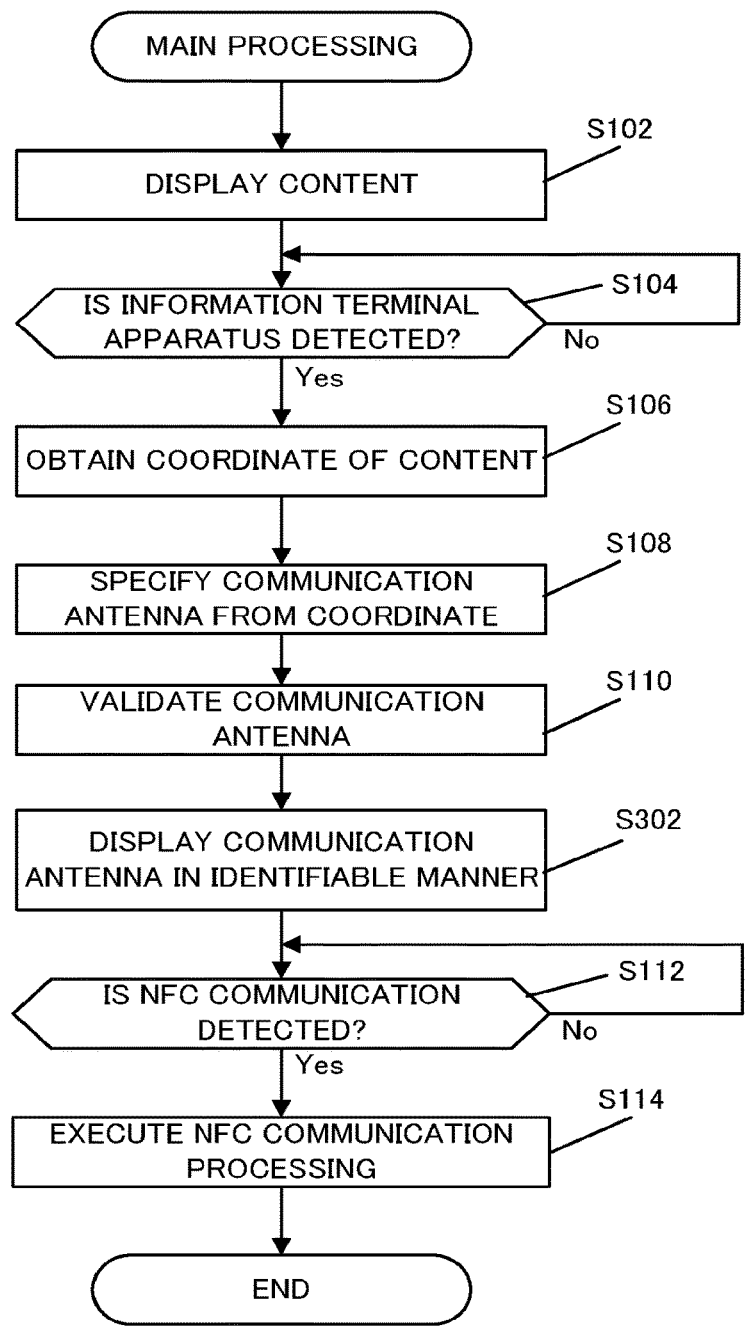
FIG. 12 is an operation flow for explaining processing in a fifth embodiment.

FIG. 12 illustrates a processing flow in the present embodiment. Note that, the processing flow of FIG. 12 is obtained by changing the processing flow of FIG. 7 described in the first embodiment, in which the same reference signs will be assigned to the same processing and description thereof will be omitted.

That is, after validating a communication antenna (step S110), identifiable display for the communication antenna is performed (step S302). Thereby, the user clearly knows where to touch.

Figure 13:
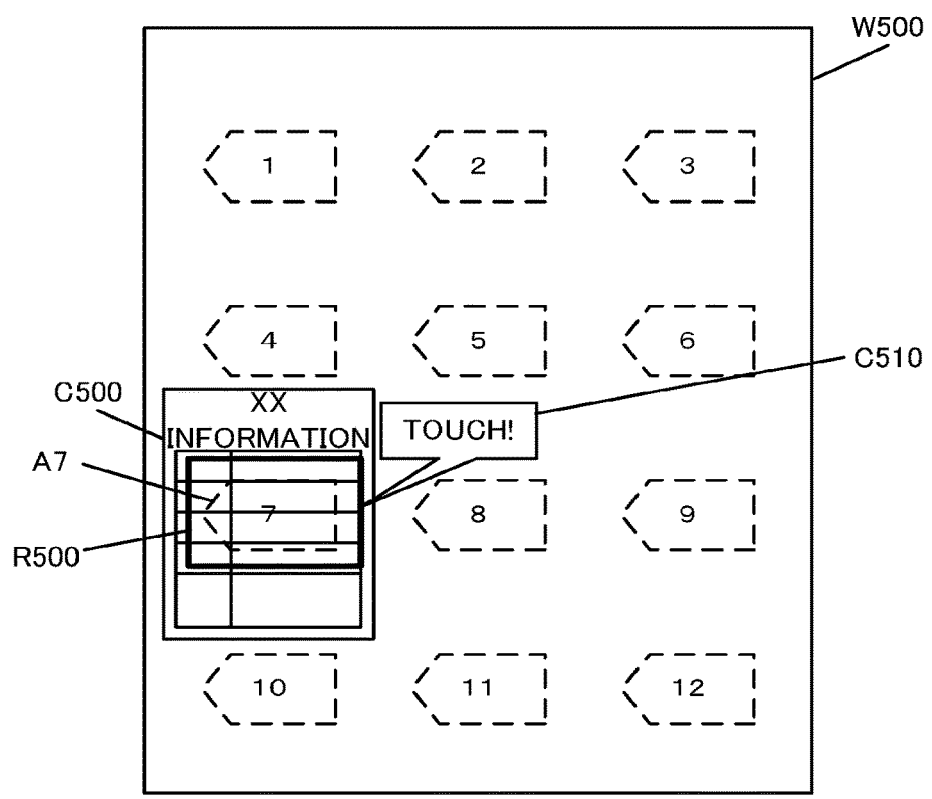
FIG. 13 is a view for explaining an example in the fifth embodiment.

For example, content C500 is displayed at a position of the non-contact antenna A7 on a display screen W500 of FIG. 13. Here, an identifiable display R500 is performed at a position where communication is allowed so that the user is able to visually recognize the non-contact antenna A7. By touching the position of the identifiable display R500, the user is able to obtain additional information.

Note that, the display may be clearly performed as "touch!" as in content C510. Thereby, the user is able to visually recognize the position to be touched more clearly. Note that, the content C510 may be displayed at a position of a non-contact antenna. Thereby, the user is only required to touch the display of "touch!" and is able to perform an intuitive operation.

Note that, the identifiable display may be performed in a different manner according to a type of the additional information. For example, it may be configured so that when the additional information is an image, the identifiable display is performed with a red frame, and when the additional information is a WEB page (URL), the identifiable display is performed with a blue frame.

6. The Sixth Embodiment

Next, a sixth embodiment will be described. The sixth embodiment is an embodiment in which a function of a touch panel is made off (that is, an operation by the touch panel is invalidated) when non-contact communication is performed.

Figure 14:
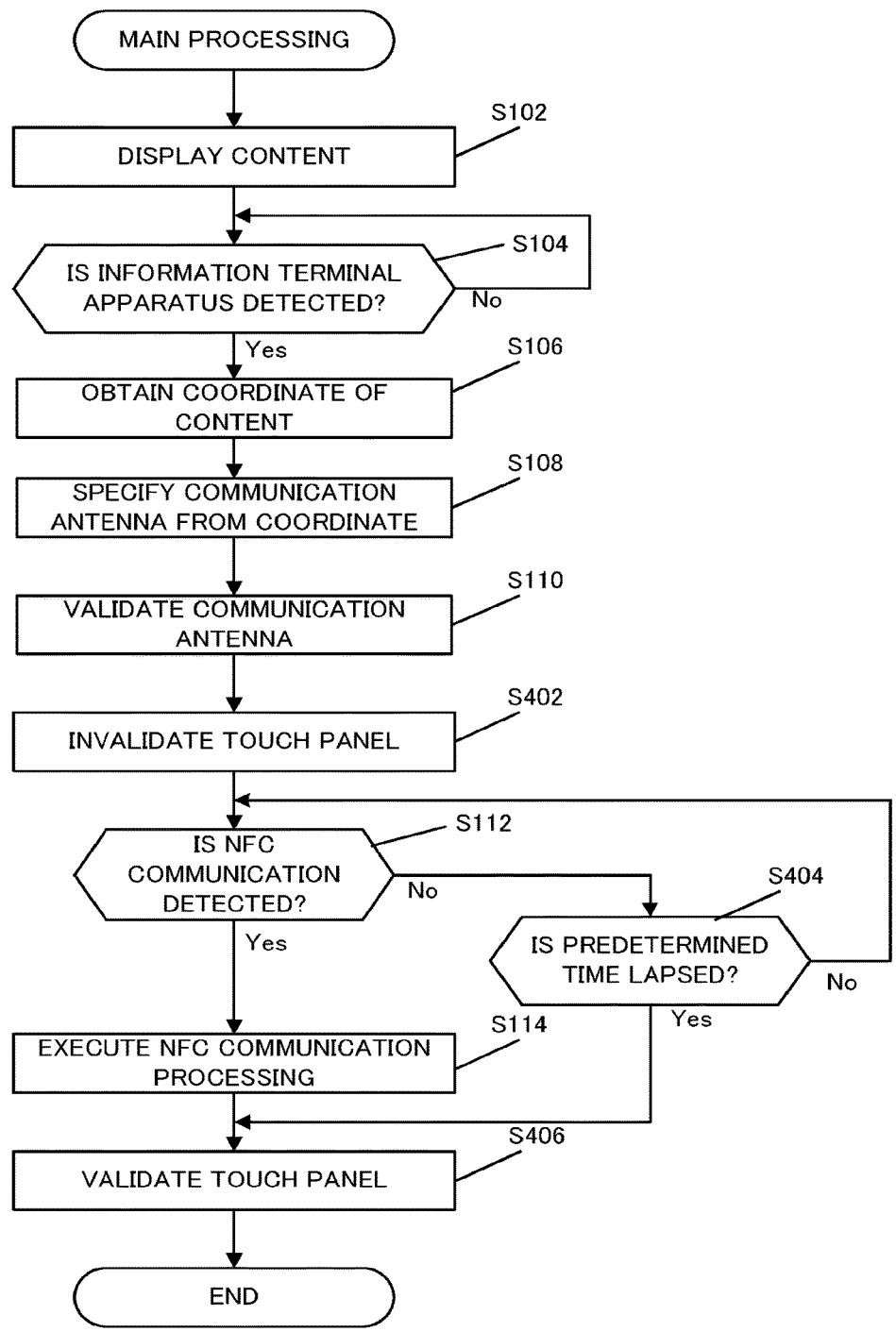
FIG. 14 is an operation flow for explaining processing in a sixth embodiment.

FIG. 14 illustrates a processing flow in the present embodiment. Note that, the processing flow of FIG. 14 is obtained by changing the processing flow of FIG. 7 described in the first embodiment, in which the same reference signs will be assigned to the same processing and description thereof will be omitted.

That is, after a communication antenna is validated (step S110), the touch panel is invalidated (step S402).

In this case, when NFC communication is detected, NFC communication processing is executed (step S112; Yes to step S114), and the touch panel is validated after the NFC communication ends (step S406).

On the other hand, when the NFC communication is not started until a predetermined time elapses even after the touch panel is invalidated, the touch panel is validated again (step S112; No to step S404; Yes to step S406).

In this manner, according to the present embodiment, when the non-contact communication (NFC communication) is started, the touch panel is invalidated. Thus, an erroneous operation by a finger touch detection when performing the non-contact communication is prevented.

Note that, a range in which the touch panel is invalidated at step S402 may be only a vicinity of the corresponding communication antenna. That is, it is possible to prevent an erroneous operation by a finger touch detection when performing the non-contact communication while allowing an entire operation of the touch panel.

7. The Seventh Embodiment

Next, a seventh embodiment will be described. The seventh embodiment is an embodiment in which a plurality of non-contact antennas are used.

Figure 15:
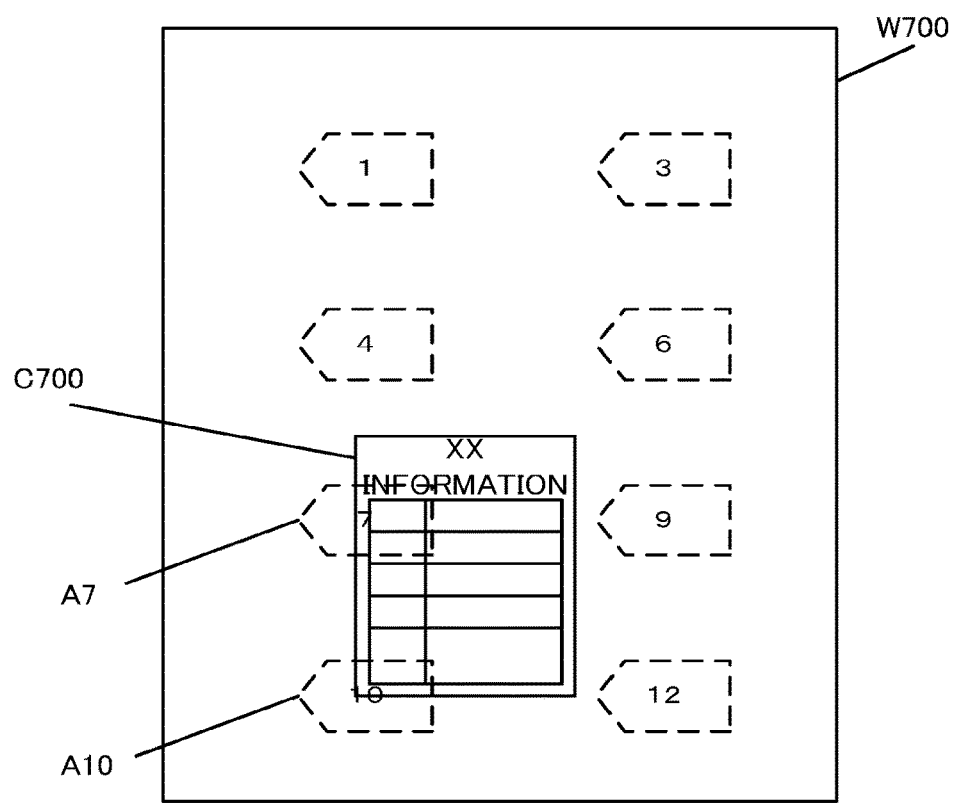
FIG. 15 is a view for explaining an example in a seventh embodiment.

For example, FIG. 15 illustrates one example of a display screen W700. Content C700 is displayed on the display screen W700, and the content C700 is displayed while overlapping the non-contact antenna A7 and a non-contact antenna A10.

In this case, with control of the antenna control portion 1230 (FIG. 3), the operation is performed by switching the non-contact antennas. That is, the non-contact antenna A7 and the non-contact antenna A10 are allowed to perform communication in each predetermined time period.

When the information terminal apparatus 3 is detected, the non-contact antenna detected by the antenna control portion 1230 is specified as the communication antenna and validated. That is, the user is able to obtain additional information with any of the non-contact antenna A7 and the non-contact antenna A10.

8. The Eighth Embodiment

Next, an eighth embodiment will be described. The eighth embodiment is an embodiment in which content is displayed at a position where a non-contact antenna exists.

Figure 16:
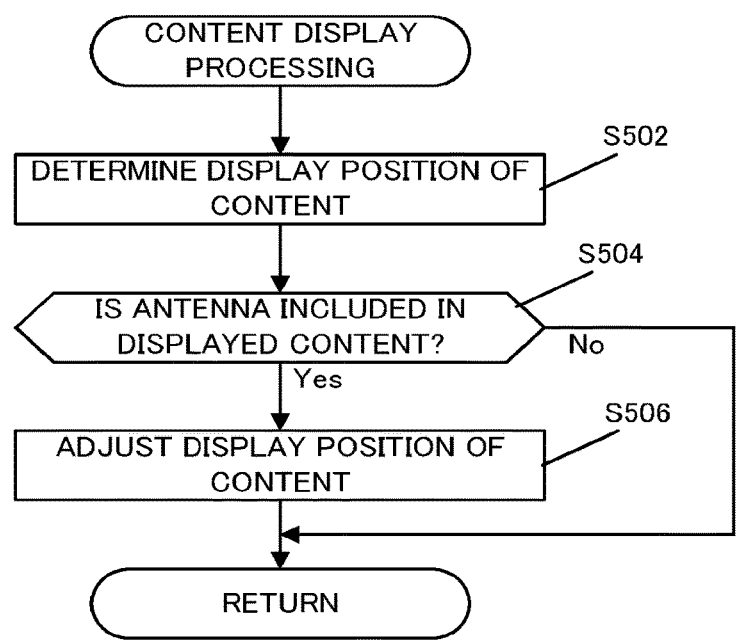
FIG. 16 is an operation flow for explaining processing in an eighth embodiment.

For example, when content is displayed on the display portion 140 (FIG. 2), content display processing of FIG. 16 is performed. First, a display position of the content is determined (step S502). Then, whether or not a non-contact antenna is included in the displayed content is judged (step S504).

When a non-contact antenna is not included in the displayed content, the display position of the content is adjusted to a position on the display portion 140, at which a non-contact antenna is included (step S504; Yes to step S506).

According to the present embodiment, in a case where a position of a non-contact antenna is shifted when content is displayed, a display position of the content is able to be adjusted. Thereby, even the content display apparatus 1 having different antenna arrangement is able to display content appropriately.

Figure 17A:
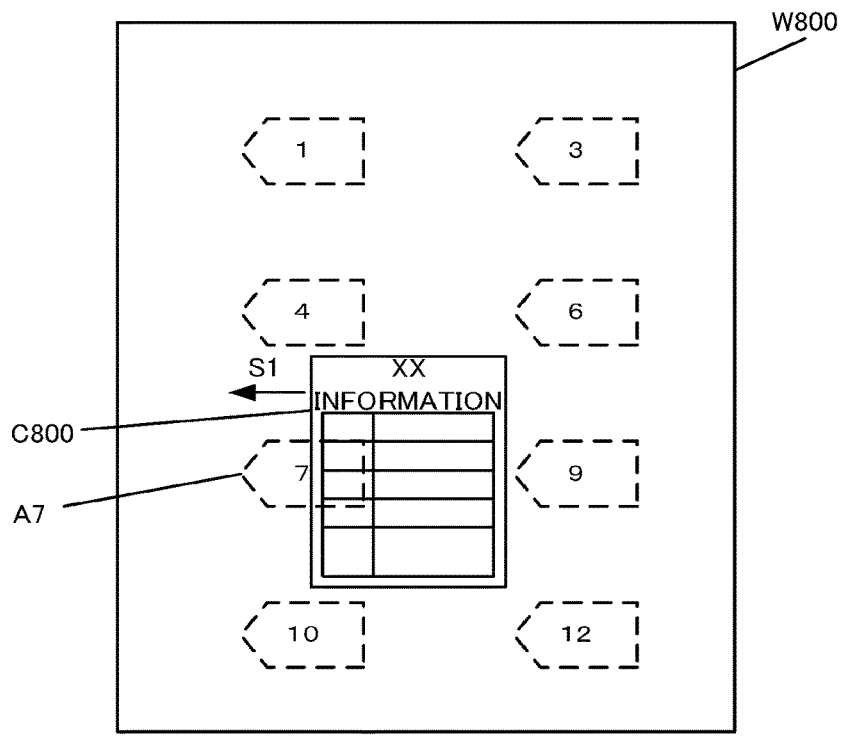
FIG. 17A is a view for explaining an example in the eighth embodiment.

It is also possible to automatically move content when the user moves the content. For example, FIG. 17A illustrates one example of a display screen W800 on which content C800 is displayed.

The content C800 is content arranged by the user. In this case, the content C800 is displayed at a position shifted from the position of the non-contact antenna A7. Thus, the content C800 is automatically moved in a direction S1.

Figure 17B:
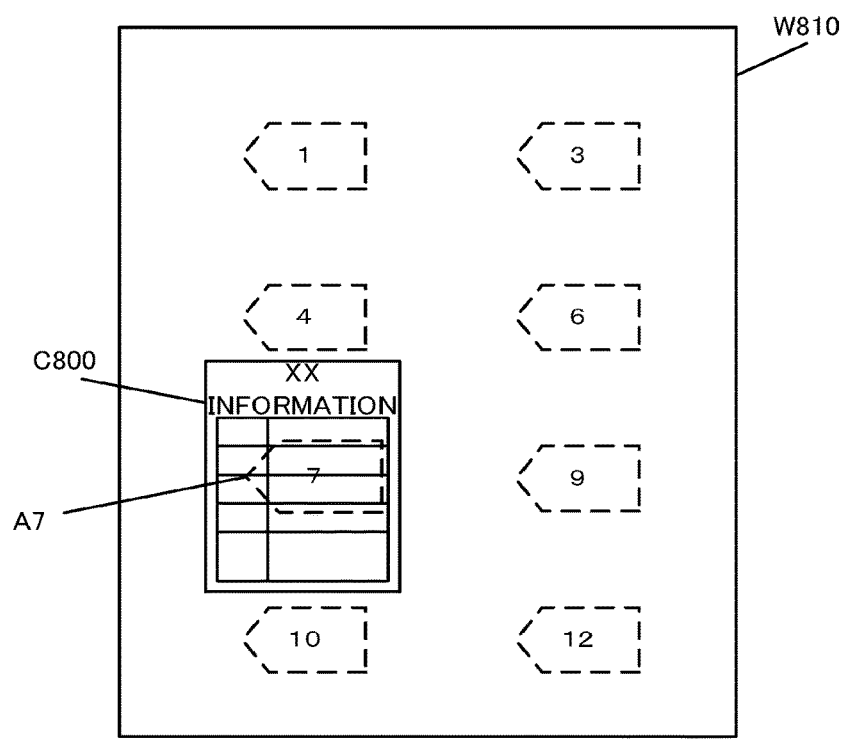
FIG. 17B is a view for explaining an example in the eighth embodiment.

Then, as illustrated in FIG. 17B, the content C800 is automatically displayed at the position of the non-contact antenna A7. At this time, the content may be moved from the displayed position so as to include the nearest antenna or may be moved to a position not overlapping other contents.

9. The Ninth Embodiment

Next, a ninth embodiment will be described. The ninth embodiment is an embodiment in which a relation between a position of a non-contact antenna and a type/details of additional information is managed in advance and content is displayed according to the type/details of additional information.

For example, it is assumed that the management is performed so that a non-contact antenna 10 and a non-contact antenna 12 are respectively associated with "coupon information" and "WEB site". In this case, the position of the displayed content is also determined according to the additional information of the displayed content.

When the type of the content is "content for children", the content is allocated to an antenna arranged in a lower part, and when being "content for adults", the content is allocated to an antenna arranged in a middle part.

In this case, it is possible to automatically determine the position at which the content is displayed according to details of the content.

10. Variational Examples

Although the embodiments of the invention have been described in detail with reference to the drawings above, the specific configuration should not be limited to the embodiments. Designs and others that do not depart from the gist of the invention should also be included in the scope of claims.

A program to be operated in each apparatus in each of the embodiments is a program (program that makes a computer function) for controlling a CPU or the like so as to realize the functions of the above-described embodiments. Information to be handed in these apparatuses is temporarily stored in a temporary storage device (e.g., RAM (Random Access Memory)) at the time of processing thereof, then is stored in storage devices such as ROM (Read Only Memory) and HDD (Hard Disc Drive), and is read out, modified and written in by the CPU as necessary.

When being distributed in the market, the program may be stored in a portable storage medium, or may be transferred to a server computer connected to a network such as the Internet. In this case, the storage device of the server computer is of course included in the invention.

Though description has been given in the above-described embodiments by taking an information terminal apparatus capable of NFC communication as an example, it may not be the terminal apparatus and may be a simple card capable of NFC communication (for example, a traffic-related card such as Suica (registered trademark), electronic-money-related card such as Edy (registered trademark), a point card, a membership card, or the like).

The above-described embodiments may be of course realized also by combining the embodiments in a consistent range. For example, the above-described embodiments may be executed by combining the second embodiment and the fourth embodiment or may be executed by combining the first embodiment and the eighth embodiment.

DESCRIPTION OF REFERENCE NUMERALS 1 content display apparatus
3 information terminal apparatus
110 control portion
120 NFC communication portion
  1210 non-contact antenna
  1220 antenna switching portion
  1230 antenna control portion
  1240 non-contact communication portion
130 NW communication portion
140 display portion
150 touch detection portion
160 storage portion
  162 content data
  164 antenna information

The invention claimed is:

1. A content display apparatus comprising:
a display portion configured to display content; and
a communication portion that transmits information corresponding to the content displayed on the display portion to an information terminal apparatus by using a communication antenna arranged on the same side as the display portion.

2. The content display apparatus according to claim 1, the communication antenna includes a plurality of communication antennae,
the communication portion has a communication antenna controller that performs control to validate a communication antenna corresponding to a display position of the content displayed on the display portion among the plurality of communication antennae.

3. The content display apparatus according to claim 2, wherein the communication antenna controller that controls in such a manner that the communication antenna is operated by switching a plurality of communication antennae in each predetermined time period.

4. The content display apparatus according to claim 1, wherein when the communication portion detects that the information terminal apparatus is close to or touched on the content on which identification information is displayed by the controller based on additional information, the communication portion transmits the additional information to the information terminal apparatus through the validated communication antenna.

5. A non-transitory recording medium recorded with a program for causing a computer, mounted on a content display apparatus, to execute:
a step of displaying content on a display portion; and
a step of transmitting information corresponding to the content displayed on the display portion to an information terminal apparatus by using a communication antenna arranged on the same side as the display portion.

6. A communication method of a content display apparatus, the communication method comprising:
displaying content on a display portion;
transmitting information corresponding to the content displayed on the display portion to an information terminal apparatus by using a communication antenna arranged on the same side as the display portion.

7. A content providing system comprising:
a content display apparatus having a display portion configured to display content; and
an information terminal apparatus;
the content display apparatus comprising:
a controller that displays the content on the display portion; and
a communication portion that transmits information corresponding to the content displayed on the display portion to the information terminal apparatus by using a communication antenna arranged on the same side as the display portion,
wherein
the information terminal apparatus has a receiving portion that receives the information corresponding to the content by performing the communication with the communication antenna.

* * * * *